Patented July 27, 1943

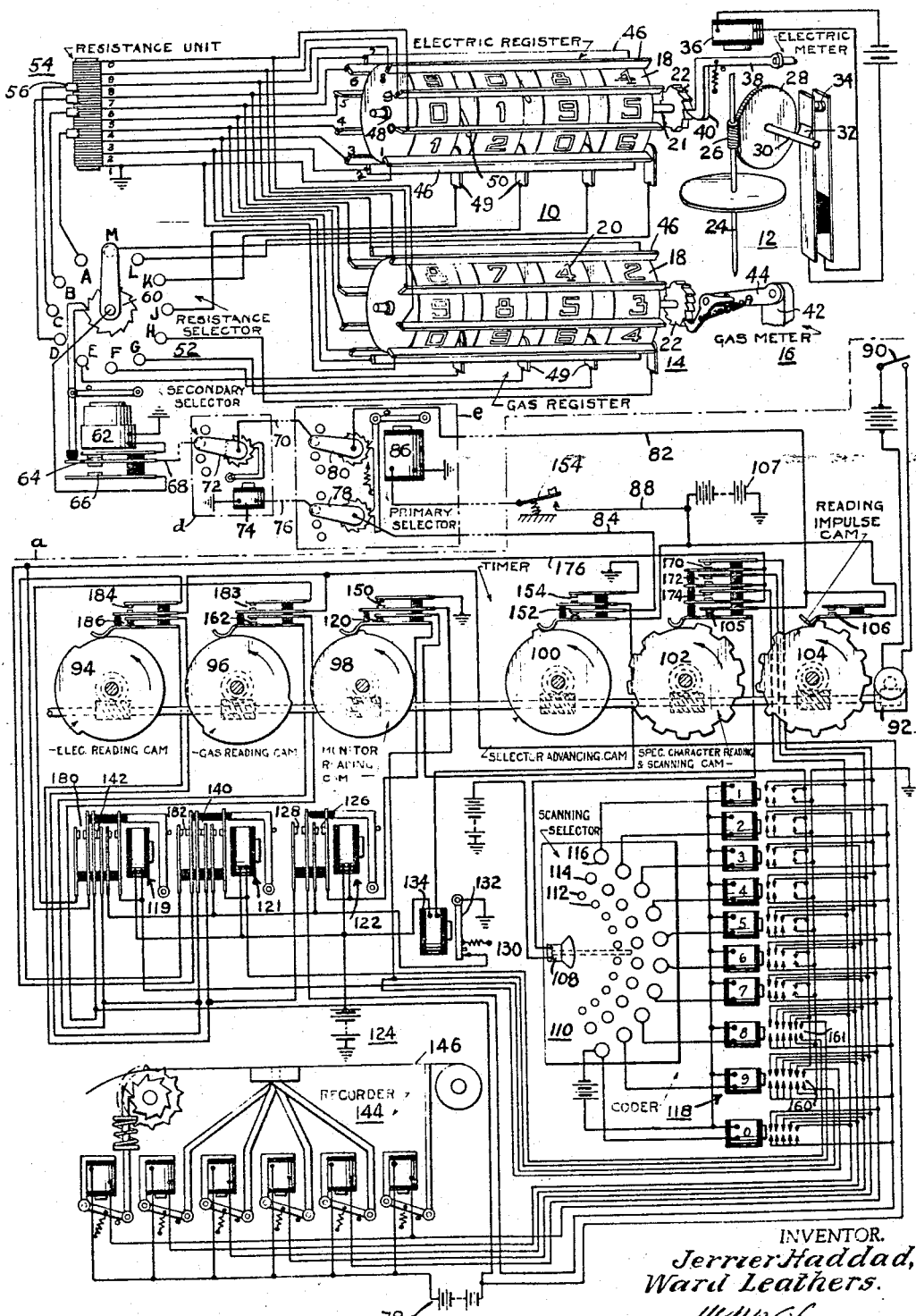

2,325,409

UNITED STATES PATENT OFFICE 2,325,409

METER READING APPARATUS

Ward Leathers and Jerrier Haddad, Brooklyn, N. Y., assignors to International Business Machines Corporation, New York, N. Y., a corporation of New York Application May 12, 1942, Serial No. 442,634

6 Claims. (Cl. 177—351)

The present invention relates to telemetering apparatus and more particularly to an apparatus wherein the readings of a multiplicity of registers may be obtained by means of resistance modulated electrical currents whose values are discriminated one from another and the corresponding readings recorded in any suitable manner at a central station. In copending applications for Letters Patent, Serial Nos. 349,974 and 349,982, both filed August 2, 1940, by Ward Leathers, for Automatic meter reading apparatus, there is disclosed a system of telemetering wherein the reading of a single register is obtained by means of resistance modulated electrical currents. The present invention relates generally to apparatus of the type disclosed in the above mentioned copending applications but is primarily designed for use by public utility companies and makes possible a joint reading of a consumer's electric meter and his gas meter, the readings being relayed to a central station over a single wire and recorded at the central station on a single record.

In providing a record of the consumption of gas and electricity under a single account number, there will arise instances where only one service or the other is used by the consumer. Such accounts may have to reckon with a temporary discontinuance of either gas or electric service, or both. In such instances, where only one record is desired, provision must be made for preventing recording of the reading of the meter which is not in service and, if desired, a special character may be recorded to indicate that that meter is not in service. If both services, i. e., electric service and gas service, are discontinued, obviously no recordings whatsoever should be made at the central station.

In accordance with the above requirements, it is among the objects of the present invention to provide a telemetering apparatus of the character set forth above which will record the first numeral of a joint meter account reading as a code, status or monitor symbol, indicating that gas service has been discontinued, that electric service has been discontinued, or that both services have been discontinued and which will thereafter record various numerals which are indicative of the actual consumption of the metered product or products or which, alternatively, will record special characters that are indicative of the consumption of one or the other metered product.

Another object of the invention is to provide an apparatus of this character which is entirely automatic in its operation and which once it has been rendered operative will continue to function indefinitely to select and record various meter readings until purposely thrown out of operation.

Numerous other objects and advantages of the invention will become more readily apparent as the nature of same is better understood.

In the accompanying single-sheet of drawings forming a part of this specification, one embodiment of the invention has been shown for illustrative purposes.

The figure is a diagrammatic view of a telemetering system for reading and jointly recording an electric meter and a gas meter under the same account number.

Referring now to the drawing in detail, a cyclometer arrangement, generally characterized by the numeral 10, represents the signaling or telemetering apparatus of an electric meter 12, and a second cyclometer, generally characterized by the numeral 14, represents a similar signaling or telemetering apparatus of a gas meter 16. The cyclometer assemblies 10 and 14 may be substantially identical in character and each includes a plurality of cyclometer wheels 18 carrying on their circumferential surfaces a plurality of indicia 20 in the form of Arabic numerals consecutively arranged from 0 to 9. The wheels or cylinders 18 are capable of independent movement on a common shaft 21 and are so designed that they will cumulatively indicate the measured volume consumption of gas or electricity, as the case may be, as expressed in cubic feet or watt hours respectively. The specific mechanism whereby such cumulative indication is attained is not disclosed and any one of a number of well known step-up cumulative mechanisms utilizing a driving ratchet wheel 22 may be employed. Irrespective, however, of the specific mechanism employed for this purpose, the essential features of the invention are always preserved.

Any suitable number of wheels or cylinders 18 may be employed but in the present instance there have been illustrated four such cylinders, the successive cylinders representing in the Arabic system units, tens, hundreds and thousands digits respectively. The units cylinder (in the case of the electric register 10) is adapted to be stepped in timed relation to the movement of the armature shaft 24 of the meter 12 and toward this end a worm 26 mounted on the armature shaft 24 meshes with a gear 28 carried on a shaft 30. A cam member 32 fixed to the shaft 30 is adapted upon rotation of the latter to periodically close a pair of normally open contacts 34 and thus close a circuit through a relay solenoid 36 to periodically energize the same. The solenoid 36 upon energization thereof attracts an armature 38 thereto, which, in turn, operates a pawl 40 which cooperates with the ratchet wheel 22 by means of which the register wheels 18 of the electric register 10 are advanced. The units cylinder (in the case of the gas meter 10) is adapted to be stepped in timed relation to the movement of a cam follower 42 forming part of the operating mechanism of the gas meter 16. This follower 42 is operatively connected to a ratchet mechanism 44 and upon reciprocation of the follower 42 the register wheels 18 of the gas register 14 are periodically operated.

A plurality of fixed contactor bars 46 are arranged in spaced relationship around the peripheries of the various cylinders 18 of the two register assemblies 10 and 14 and are of a sufficient length to span all four of these cylinders. Each cylinder is provided with a metallic hub portion 48 to which there is affixed and electrically connected one end of a spiral contactor or distributor member in the form of a spring 50, the outer end of which is adapted to successively engage the various indicator bars 46. The specific point of attachment of each of the springs 50 to its respective hub portion 48 and its length is such that as each indexing operation is performed, the outer end of the spring will bear against a contactor bar 46 associated with the particular numeral or indicia indicated by the register. Accordingly, the various contactor bars in addition to their designating reference character have for illustrative purposes been indicated with Arabic numerals corresponding to those appearing on the face or peripheries of the cylinders 18. Each hub portion 48 in effect constitutes a slip ring and makes sliding contact with a brush 49, and these latter brushes are connected by lead wires to respective contacts J, K, L and M provided on a selector switch 52, the connections being made for a purpose that will appear presently. Each of the conductor bars 46 is connected by means of suitable lead wires to a wire-wound resistance unit 54 at varying tap points thereon designated successively by Arabic numerals corresponding to the various digits of the indicia carried by the cylinders 18.

The selector switch 52, in addition to the contacts J, K, L and M, includes four additional contacts A, B, C and D, which are adapted to be selectively connected by means of lead wires and spring clips 56 to selected tap points on the resistor 54 representing particular identifying account numbers, as will appear presently. The selector switch 52 is adapted to be remotely controlled and in addition to the contacts A, B, C and D, and J, K, L and M previously mentioned, includes additional contacts E, F, G and H. The contacts J, K, L and M accommodate and are connected to the brushes 49 of the electric register 10 while the contacts E, F, G and H accommodate and make contact with the brushes 49 of the gas meter 14.

The selector switch 52 is adapted to be periodically operated by means of a ratchet mechanism 60 whose movements are controlled by a relay solenoid 62 which operates when energized to open a normally closed pair of contacts 64 and to close a normally open pair of contacts 66, the former contacts 64 controlling the energization of the relay solenoid 62.

The arrangement of parts thus far described is located at or near the consumer's gas and electric meters at an outlying station which, in the accompanying drawing, is represented by the space existing above the broken line a. The boxed space contained within the broken line d represents a conventional secondary field selector at another outlying station which is connected by a plurality of wires, one of which is indicated at 68, to a plurality of gas and electric meter groups. According to the present invention the secondary selector d is adapted to be electrically connected in this manner to one hundred such meter groups. The boxed space existing within the broken line e represents a primary field selector of more or less conventional design, which is connected by a plurality of main channels or wires, one of which is indicated at 70, to a plurality of the secondary selectors d. It is intended that the primary selector be connected to one hundred of the secondary selectors.

Each of the secondary selectors includes a stepping switch mechanism 72 for establishing continuity over the reading lines 68 and 70 to the primary selector e. The secondary selector also includes a relay solenoid 74 for actuating the stepping switch 72 and this solenoid is connected by a wire 76 to one of a pair of stepping switches 78 and 80 contained in the primary selector e.

The space existing in the drawing below the broken line a represents a central station which may be located at a point remote from the outlying meter locations, the secondary selector location and the primary selector location. Each primary selector is connected to the central station by means of a wire 82 which forms a continuation of the reading line 68, 70. Each primary selector includes a relay solenoid 86 for operating the stepping switches 78 and 80 and the stepping switch 78 is connected by means of a wire 84 to the central station for a purpose presently to appear. The winding of the solenoid 86 is connected by means of a wire 88 to the central station for a purpose that also will presently appear.

Each of the twelve contacts A, B, C, D, E, F, G, H, J, K, L and M of the selector switch 60 represents a numeral which, according to the present invention, must be read or recorded by a resistance reading method at the central station in a definite sequential order. The contact A is intended to represent the first numeral to be read and this contact is electrically connected to one of the ten tap points 56 on the resistor 54. Arbitrarily, if all service to the consumer using both gas and electricity is discontinued it is intended that the recorded numeral shall be 0 and toward this end the contact A will be connected to a tap point of minimum or zero resistance on the resistor 15. Arbitrarily, if the consumer has discontinued using electric service, as registered by the cyclometer register 10, the contact A will be wired to the resistance tap 56 which represents the numeral 9 on the resistor 54. Finally, if the consumer has discontinued using the gas service registered by the cyclometer register 14 the contact A will be arbitrarily connected to the tap 56 on the resistor 54 which represents the numeral 8. If the consumer utilizes both electric and gas service the contact A will be connected to other tapped points on the resistor and in this manner the first reading to be taken arbitrarily becomes a code numeral. For example, if the tap 56, which is connected to the contact A, is attached to the resistor 54 at a point of ground potential nothing will be recorded at the central station. If this tap is connected to a point on the resistor 54 which represents the numeral 9 the reading of the electric register 10 will not be recorded and in its place will occur a special code character. If the first numeral to be read represents the digit 8 the recording of the other cyclometer register 14 will not be recorded and in its stead there will be recorded another such character. The processes involved are accomplished automatically at the central reading station. The code numeral, of course, is set by hand when the service is first initiated.

As previously stated, the wires 82, 84 and 88 lead from the primary selector e to the central station which is shown in the space beneath the broken lines a in the drawing. By means of these three wires, ten thousand combined gas and electric accounts may be read and recorded since the selector e may be wired to one hundred secondary selectors d and the secondary selectors each wired to one hundred of the combined gas and electric meter groups.

Referring now to that portion of the drawing which exists below the line a, and which represents the central reading station, closing of a manually operable switch 90 serves to energize an electric motor 92 which upon rotation thereof imparts synchronous movement to a plurality of rotary cam discs 94, 96, 98, 100, 102 and 104. The various cam discs just mentioned operate upon rotation thereof to open and close various contacts in timed relationship and serve to control the automatic functioning of the entire meter reading and recording system. The disc 104 has applied thereto the legend "Reading impulse cam" and upon rotation of this disc a pair of contacts 106 are periodically opened and closed, thus intermittently connecting the line or channel 82 to a battery 107 and energizing the relay solenoid 62 of the selector switch 52 through the normally closed contacts 64. The ratchet mechanism 60 is thus caused to operate to advance the selector switch one step and establish communication between the line 68 and the contact A through the contacts 66 which become closed immediately upon energization of the solenoid 62. At the same time, the contacts 64 become opened but inasmuch as the solenoid 62 is of the retarded or delayed action type the same will remain energized for a short period of time after each initial impulse applied thereto.

As the various timer discs continue to rotate and the contacts 106 become opened the line 82 becomes connected to a galvanometer 108 through a pair of contacts 105 associated with the cam disc 102. The galvanometer 108 constitutes one element of a scanning selector designated generally at 110 and so legended in the drawing. The scanning selector 110 is fully illustrated and described in a copending application of Ward Leathers, Serial No. 361,798, filed October 18, 1940, for an Automatic meter reading apparatus, and reference may be had to this application for a full disclosure thereof. Briefly, however, this scanning selector includes a row of ten photoelectric devices 112 having associated therewith a series of respective amplifying tubes 114 which in turn control the operation of a series of relays 116. The galvanometer 108 controls the motion of a sensitive pivoted mirror mounted on the axis of its indicating needle. A beam of light issuing from a fixed source is directed upon the mirror and the mirror as it rotates throughout various angles which are proportionate to the strength of the induced magnetic field reflects the light issuing from the source to the various photoelectric devices 112. The particular photoelectric device selected by the scanning mirror in each instance depends upon the amount of resistance introduced into the reading line 68, 70 and 82 by the various portions of the resistor 54 which are selected for reading purposes by the selector switch 52. For example, if the contact A of the selector switch 52 is connected to the fifth tap 56 on the resistor 54, light issuing from the source at the galvanometer will be swung in the form of a beam into register with the fifth photoelectric device in the series 112 and will cause a corresponding relay to close, thus energizing the fifth relay of a series contained within a coding device generally characterized by the numeral 118 and so legended in the drawing. Upon operation of the fifth relay in the coding device 118 a circuit is completed from the relay contacts in the coding device through a pair of contacts 120 whose opening and closing movements are controlled by means of the cam disc 98 and through a relay solenoid 122 and battery 124. The relay solenoid 122 upon being energized closes a pair of contacts 126 and 128. The contacts 126 when closed complete a circuit through the battery 124, relay solenoid 122, the contacts 126 themselves, a contact 130 and an armature 132 forming part of a relay assembly together with a relay solenoid 134. Thus, as long as the relay solenoid 122 is energized the pairs of contacts 126 and 128 remain closed. As long as the pair of contacts 126 remain closed the relay solenoid 122 will remain energized. Unless the relay solenoid 134 is energized to throw its armature 132 away from the contact 130 the solenoid containing circuit just described will remain energized and the relays controlled thereby will be locked.

The contacts 128 are in series with a pair of normally closed contacts 140 and 142 and thus, upon closing of the contacts 128, one of the coder relays (in the present instance the fifth relay of the series) will actuate a recorder or perforator 144 in such a manner as to cause a coded character to be perforated on a tape 146. The coding device 118 and the recorder 144 are substantially the same as the coding device and recorder illustrated and described in the copending applications above referred to and reference may be had to these applications for a full disclosure of these instrumentalities. For a disclosure of one arbitrary form of code that may be perforated on the tape 146, reference may be had to a copending application Serial No. 349,975, filed August 2, 1940, by Ward Leathers, for Automatic meter reading apparatus. Upon further rotation of the various legended cam discs, the contacts 120 and 150 will become open and the contacts 106 will become closed. The line 82 will thus again be connected to the battery 107 whereupon the solenoid 62 is again energized and the resistance selector switch 52 is advanced from the contact A to the contact B. The reading of that portion of the resistance unit which is connected to the contact B is made in exactly the same manner as has been described in connection with the reading of that portion of the resistance unit which is connected to the contact A and this reading is recorded on the tape 146. The numerals which are read, however, will have no effect on the solenoids 119, 121 and 122 inasmuch as the contacts 120 and 150 are in series with these solenoids and are closed only during the reading of the first numeral in each account.

In this manner twelve numerals, one for each of the contacts of the resistance selector 52, are successively read. Arbitrarily, the first numeral, i. e. the numeral which is read in connection with the contact A of the selector switch 52 is the monitor numeral or character. This character is a status indicating character indicative of the type of service rendered by either or both meters. The next three numerals associated with the contacts B, C and D serve to identify the account by number. The next four numerals which are associated with the contacts E, F, G, and H serve to give a reading of the electric register 10. The last four numerals which are associated with the contacts J, K, L and M serve to give a reading of the gas register 14. Upon completion of the twelve readings just described, the selector advancing cam disc 100 advances and closes a pair of contacts 152 and 154. The former contact, when closed, operates to connect the battery 107 to the line 84 thus energizing the solenoid 74 in the selector d and causing this selector to advance the apparatus for operative reading of the next succeeding account. The contact 150 when closed serves to energize the solenoid 122 by means of the battery 124 and break the current supply to the solenoid 134 allowing the contacts 130 to return to their normally closed position. The apparatus is then ready for a reading of the next account. After one hundred accounts have been read the primary selector e is caused to select the next secondary selector d by momentarily closing a switch 154 to connect the battery 107 to the line 88 and thus energize the solenoid 86 causing it to advance the primary selector.

In the above description arbitrary selection of the numeral 5 as the monitor or status character has been made for illustrative purposes. Actually this monitor character may be any one of the ten Arabic numerals. According to the present system if the monitor character is the numeral 0 the central station apparatus will prevent any recording of characters whatsoever. This is desirable because the digit 0 when used as a first or monitor character in an account reading signifies the fact that neither gas nor electric service is being used and therefore no readings are required for billing purposes. If the monitor character is the numeral 1 according to the present system full readings will be made of both gas and electric service according to a predetermined schedule, as, for example, where a special gas rate and a special electric rate prevails. If the numeral 2 is employed for the monitor character this may indicate gas and electric rates of a different special character. The numeral 3 when employed as a monitor character may indicate one type of gas rate and a different type of electric rate. The numerals 4, 5, 6 and 7 may also indicate special types of gas and electric rates. If the numeral 8 is employed as a monitor character this may indicate that no gas service is being rendered although electric service prevails. Finally, if the numeral 9 is employed for a monitor character this may indicate that a gas service is being rendered while electric service has been discontinued.

Assuming now that the monitor character or first numeral appearing on the tape 146 is the numeral 0 and that neither gas nor electric service is being rendered and no recording of characters is made on the tape 146, reading of the numeral 0 by the scanning selector 110 causes the first coder relay 116 to become actuated. However, nothing is reflected to the perforator or recorder 144 because its common wire is broken by the contact 128 which is controlled by the solenoid 122. This contact 128 is closed only when the solenoid 122 is actuated and this may occur only when its circuit is completed by closing of the contacts 120 controlled by the monitor reading cam disc 98 and by closing of one of the contacts controlled by any one of the coder relays other than the relay labeled 0. Thus, when the numeral 0 is set up in the resistance unit 54 to become a monitor character the solenoid 122 remains deenergized and no recording for the particular account number under consideration is made. The contacts 150 which are controlled by the monitor reading cam disc 98 become opened immediately after reading of the first monitor numeral, thus making it impossible for any character other than the monitor character itself to close the solenoid 122.

In an instance where the monitor character is the numeral 9 under the arbitrary set of circumstances set forth above, recording of the reading of the electric register 10 is made impossible. In this instance, although the solenoid 122 will become energized allowing the contacts 128 to complete a common line to the recorder or perforator 144 another solenoid 119 will also become energized due to the existence of a special pair of contacts 160 existing in connection with the relay labeled 9 in the coding device 118. As stated previously, the coding device 118 is substantially identical with the coding device shown in the above mentioned copending applications but differs therefrom solely by the presence of the pair of contacts 160 which are associated with the relay labeled 9. Upon energization of the solenoid 119 the pair of contacts 142 are open to break the common line to the recorder 144 despite the action of the contacts 128 controlled by the solenoid 122. A pair of contacts 162 controlled by the action of the gas reading cam disc 96 are wired in parallel to the pair of contacts 142. The gas reading cam disc 96 thus causes the normally closed contacts 162 to open during the time that the electric register 10 would ordinarily be read, thus maintaining the common line to the recording apparatus 144 open so that no reading of the electric register is made.

In order to retain the proper relative spacing of the various perforated characters on the tape 146, a special spacing character is employed in place of the "blanked" reading of the register 10. Since each blank numeral requires one special character, three contacts 170, 172 and 174 are provided for cooperation with the special character reading cam disc 102. The three contacts just mentioned are directly wired to the recorder 144 and accommodate both the perforating of the tape and the advance of the same whenever their common lead line 176 is connected to the recorder battery 178. A pair of contacts 180 and 182 which are controlled by the relays 119 and 121 are interposed in the lead line 176 and are adapted to become closed whenever a numeral representing a reading of the electric register 10 is blanked. If such a reading is not blanked but is adapted to be recorded on the tape 146, neither of the contacts 180 nor 182 is closed and the path through the common lead line 176 is broken, thus making it impossible to perforate a special character on the tape. Where the reading of the gas cyclometer 14 is blanked and the solenoid 119 is energized, the lead line 176 will be connected through the contacts 182 and an additional pair of contacts 183 on the gas reading cam. The contacts 183 are closed during that part of the cycle when the cyclometer 11 is being blanked. The common lead 176 will therefore become connected to the recorder battery 178 to perforate the special character on the tape 146 each time the special character reading cam 102 closes the contacts 170, 172 and 174.

In the instance where the monitor character set up in the resistance unit 54 is the numeral 8, recording of the gas register 14 is made impossible. Toward this end the solenoid 121 becomes closed by virtue of the presence of an additional pair of contacts 161, similar to the contacts 160, associated with the relay labeled 8 in the coder 118. The various blanking actions that take place in this instance are controlled by contacts 184 and 186 associated with the electric reading cam disc 94. The various sequence of operations which take place to cause blanking of the gas register 14 are similar to those operations which have just been described in connection with the electric register 10 and, similarly, provision is made for recording the special blanking character on the tape 146 during such blanking operations. It will be obvious that the choice of the various relays in the coding mechanism 118 for blanking either of the two registers 10 or 14, or both of them, or in making provision for special gas and electric rates is purely arbitrary. Whereas the relays labeled 8 and 9 have been employed for blanking the gas and electric registers respectively, it is obvious that any other pair of relays might well be selected. Similarly, any of the relays may be selected for blanking both of these registers. Irrespective, however, of these purely arbitrary details in the operation of the apparatus the essential features inherent in the construction of the apparatus remain substantially the same.

The invention is not to be limited to the exact arrangement of parts shown in the accompanying drawing or described in this specification as various changes in detail of construction may be resorted to without departing from the spirit of the invention. Only insofar as the invention has been particularly pointed out in the claims is the same to be limited.

What is claimed is:

1. In a telemetric system for obtaining at a central station information relating to the reading of a pair of integrated meters each having a plurality of rotating members and located at a point remote from the central station comprising a series of resistances having values which are correlated with the different positions capable of being assumed by said members, a reading circuit, contact means associated with each member for selecting the various correlated resistances as said member rotates, a resistance selector for successively selecting predetermined arbitrary resistances and connecting them in said reading circuit to vary the impedance value thereof and also for successively connecting the selected resistances, first of one contact means and thereafter of the other contact means, in the reading circuit to likewise vary the impedance value thereof, discriminating means for discriminating between the various impedance values of the reading circuit, exhibiting means under the control of said discriminating means for exhibiting the discriminated values, and means operable when certain predetermined arbitrary resistances are connected in the reading circuit for rendering said exhibiting means inoperative.

2. In a telemetric system for obtaining at a central station information relating to the reading of a pair of integrated meters each having a plurality of rotating members and located at a point remote from the central station comprising a series of resistances having values which are correlated with the different positions capable of being assumed by said members, a reading circuit, contact means associated with each member for selecting the various correlated resistances as said member rotates, a resistance selector for successively selecting predetermined arbitrary resistances and connecting them in said reading circuit to vary the impedance value thereof and also for successively connecting the selected resistances, first of one contact means and thereafter of the other contact means, in the reading circuit to likewise vary the impedance value thereof, discriminating means for discriminating between the various impedance values of the reading circuit, exhibiting means under the control of said discriminating means for exhibiting the discriminated values, means operable when certain predetermined arbitrary resistances are connected in the reading circuit for rendering said exhibiting means inoperative during the successive connecting of resistances when the resistances selected by one of said contact means are connected in the reading circuit.

3. In a telemetric system for obtaining at a central station information relating to the reading of a pair of integrated meters each having a plurality of rotating members and located at a point remote from the central station comprising a series of resistances having values which are correlated with the different positions capable of being assumed by said members, a reading circuit, contact means associate with each member for selecting the various correlated resistances as said member rotates, a resistance selector for successively selecting predetermined arbitrary resistances and connecting them in said reading circuit to vary the impedance value thereof and also for successively connecting the selected resistances, first of one contact means and thereafter of the other contact means, in the reading circuit to likewise vary the impedance value thereof, discriminating means for discriminating between the various impedance values of the reading circuit, exhibiting means under the control of said discriminating means for exhibiting the discriminated values, means operable when certain predetermined arbitrary resistances are connected in the reading circuit for rendering said exhibiting means inoperative during the successive connecting of resistances when the resistances selected by both of said contact means are connected in the reading circuit.

4. In a telemetric system for obtaining at a central station information relating to the reading of a pair of integrated meters each having a plurality of rotating members and located at a point remote from the central station comprising a series of resistances having values which are correlated with the different position capable of being assumed by said members, a reading circuit, contact means associated with each member for selecting the various correlated resistances as said member rotates, a resistance selector for successively selecting predetermined arbitrary resistances and connecting them in said reading circuit to vary the impedance value thereof and also for successively connecting the selected resistances, first of one contact means and thereafter of the other contact means, in the reading circuit to likewise vary the impedance value thereof, discriminating means for discriminating between the various impedance values of the reading circuit, exhibiting means under the control of said discriminating means for exhibiting the discriminated values, and electromagnetic means operable when certain predetermined arbitrary resistances are connected in the reading circuit for rendering said exhibiting means inoperative.

5. In a telemetric system for obtaining at a central station information relating to the reading of a pair of integrated meters each having a plurality of rotating members and located at a point remote from the central station comprising a series of resistances having values which are correlated with the different positions capable of being assumed by said members, a reading circuit, contact means associated with each member for selecting the various correlated resistances as said member rotates, a resistance selector for successively selecting predetermined arbitrary resistances and connecting them in said reading circuit to vary the impedance value thereof and also for successively connecting the selected resistances, first of one contact means and thereafter of the other contact means, in the reading circuit to likewise vary the impedance value thereof, discriminating means for discriminating between the various impedance values of the reading circuit, exhibiting means under the control of said discriminating means for exhibiting the discriminated values, a pair of contacts operable when closed to render said discriminating means operable, an electromagnet operable upon energization thereof to open said contacts and means operable when certain predetermined arbitrary resistances are connected in the reading circuit for energizing said electromagnet.

6. In a telemetric system for obtaining at a central station information relating to the reading of a pair of integrated meters each having a plurality of rotating members and located at a point remote from the central station comprising a series of resistances having values which are correlated with the different positions capable of being assumed by said members, a reading circuit, contact means associated with each member for selecting the various correlated resistances as said member rotates, a resistance selector for successively selecting predetermined arbitrary resistances and connecting them in said reading circuit to vary the impedance value thereof and also for successively connecting the selected resistances, first of one contact means and thereafter of the other contact means, in the reading circuit to likewise vary the impedance value thereof, discriminating means for discriminating between the various impedance values of the reading circuit, exhibiting means under the control of said discriminating means for exhibiting the discriminated values, a pair of contacts operable when open to render said discriminating means inoperative, a second pair of contacts also operable when open to render said discriminating means inoperative, an electromagnet for each of said pairs of contacts operable upon energization thereof to open its respective pair of contacts, means operable when certain predetermined arbitrary resistances are connected in the reading circuit for energizing one of said electromagnets and means operable when certain other predetermined arbitrary resistances are connected in the reading circuit for energizing said other electromagnet.

WARD LEATHERS.
JERRIER HADDAD.